(12) United States Patent
Ikeda

(10) Patent No.: US 9,389,834 B2
(45) Date of Patent: Jul. 12, 2016

(54) PSEUDORANDOM NUMBER GENERATING CIRCUIT AND METHOD

(71) Applicant: Socionext Inc., Yokohama-shi, Kanagawa (JP)

(72) Inventor: Noriyuki Ikeda, Akishima (JP)

(73) Assignee: Socionext Inc., Yokoham (JP)

( * ) Notice: Subject to any disclaimer, the term of this patent is extended or adjusted under 35 U.S.C. 154(b) by 125 days.

(21) Appl. No.: 14/183,084

(22) Filed: Feb. 18, 2014

(65) Prior Publication Data

US 2014/0237012 A1    Aug. 21, 2014

(30) Foreign Application Priority Data

Feb. 21, 2013  (JP) ................................. 2013-032361

(51) Int. Cl.
*G06F 7/58*         (2006.01)
(52) U.S. Cl.
CPC ...................................... *G06F 7/584* (2013.01)
(58) Field of Classification Search
None
See application file for complete search history.

(56) References Cited

U.S. PATENT DOCUMENTS

| | | | |
|---|---|---|---|
| 5,434,807 A | 7/1995 | Yoshida | |
| 6,263,082 B1 * | 7/2001 | Ishimoto | G06F 7/584 380/265 |
| 6,459,722 B2 * | 10/2002 | Sriram | G06F 7/584 375/130 |
| 6,594,680 B1 * | 7/2003 | Gu | G06F 7/584 708/252 |
| 7,142,675 B2 * | 11/2006 | Cheng | H04L 9/0668 380/28 |
| 7,979,482 B2 * | 7/2011 | Gammel | G06F 7/584 331/78 |
| 2002/0013797 A1 * | 1/2002 | Jha | G06F 7/584 708/250 |
| 2002/0016805 A1 * | 2/2002 | Smeets | G06F 7/58 708/251 |
| 2007/0174374 A1 * | 7/2007 | Inoha | G06F 7/584 708/252 |
| 2014/0237012 A1 * | 8/2014 | Ikeda | G06F 7/584 708/252 |

FOREIGN PATENT DOCUMENTS

| | | |
|---|---|---|
| JP | 01-265609 A | 10/1989 |
| JP | 02-090320 A | 3/1990 |
| JP | 06-291619 A | 10/1994 |
| JP | 2003-330704 A | 11/2003 |

* cited by examiner

*Primary Examiner* — David H Malzahn
(74) *Attorney, Agent, or Firm* — Arent Fox LLP

(57) ABSTRACT

A pseudorandom number generating circuit includes: a first generator including a shift register and configured to generate a first pseudorandom number, the shift register including registers, the first pseudorandom number having a plurality of bits corresponding to the registers; a second generator configured to generate a second pseudorandom number; and a selector configured to select a bit that is to be output from the plurality of bits by using the second pseudorandom number.

11 Claims, 8 Drawing Sheets

| CYCLE | DECIMAL NOTATION | D7 | D6 | D5 | D4 | D3 | D2 | D1 | D0 |
|---|---|---|---|---|---|---|---|---|---|
| 1 | 48 | 0 | 0 | 1 | 1 | 0 | 0 | 0 | 0 |
| 2 | 96 | 0 | 1 | 1 | 0 | 0 | 0 | 0 | 0 |
| 3 | 192 | 1 | 1 | 0 | 0 | 0 | 0 | 0 | 0 |
| 4 | 129 | 1 | 0 | 0 | 0 | 0 | 0 | 0 | 1 |
| 5 | 3 | 0 | 0 | 0 | 0 | 0 | 0 | 1 | 1 |
| 6 | 7 | 0 | 0 | 0 | 0 | 0 | 1 | 1 | 1 |
| 7 | 14 | 0 | 0 | 0 | 0 | 1 | 1 | 1 | 0 |
| 8 | 29 | 0 | 0 | 0 | 1 | 1 | 1 | 0 | 1 |
| 9 | 58 | 0 | 0 | 1 | 1 | 1 | 0 | 1 | 0 |
| 10 | 116 | 0 | 1 | 1 | 1 | 0 | 1 | 0 | 0 |
| 11 | 233 | 1 | 1 | 1 | 0 | 1 | 0 | 0 | 1 |
| 12 | 210 | 1 | 1 | 0 | 1 | 0 | 0 | 1 | 0 |
| 13 | 164 | 1 | 0 | 1 | 0 | 0 | 1 | 0 | 0 |
| 14 | 72 | 0 | 1 | 0 | 0 | 1 | 0 | 0 | 0 |
| 15 | 145 | 1 | 0 | 0 | 1 | 0 | 0 | 0 | 1 |
| 16 | 35 | 0 | 0 | 1 | 0 | 0 | 0 | 1 | 1 |
| ... | ... | . | . | . | . | . | . | . | . |

FIG. 6

| CYCLE | DECIMAL NOTATION | D7 | D6 | D5 | D4 | D3 | D2 | D1 | D0 |
|---|---|---|---|---|---|---|---|---|---|
| 1 | 132 | 1 | 0 | 0 | 0 | 0 | 1 | 0 | 0 |
| 2 | 72 | 0 | 1 | 0 | 0 | 1 | 0 | 0 | 0 |
| 3 | 168 | 1 | 0 | 1 | 0 | 1 | 0 | 0 | 0 |
| 4 | 56 | 0 | 0 | 1 | 1 | 1 | 0 | 0 | 0 |
| 5 | 16 | 0 | 0 | 0 | 1 | 0 | 0 | 0 | 0 |
| 6 | 33 | 0 | 0 | 1 | 0 | 0 | 0 | 0 | 1 |
| 7 | 175 | 1 | 0 | 1 | 0 | 1 | 1 | 1 | 1 |
| 8 | 39 | 0 | 0 | 1 | 0 | 0 | 1 | 1 | 1 |
| 9 | 106 | 0 | 1 | 1 | 0 | 1 | 0 | 1 | 0 |
| 10 | 176 | 1 | 0 | 1 | 1 | 0 | 0 | 0 | 0 |
| 11 | 244 | 1 | 1 | 1 | 1 | 0 | 1 | 0 | 0 |
| 12 | 18 | 0 | 0 | 0 | 1 | 0 | 0 | 1 | 0 |
| 13 | 144 | 1 | 0 | 0 | 1 | 0 | 0 | 0 | 0 |
| 14 | 221 | 1 | 1 | 0 | 1 | 1 | 1 | 0 | 1 |
| 15 | 43 | 0 | 0 | 1 | 0 | 1 | 0 | 1 | 1 |
| 16 | 208 | 1 | 1 | 0 | 1 | 0 | 0 | 0 | 0 |
| ... | ... | . | . | . | . | . | . | . | . | ial polynomials exist. Thus, according to the first to third methods, it is difficult to generate a random number composed of a desired number of bits with high randomness.

PSEUDORANDOM NUMBER GENERATING CIRCUIT AND METHOD

CROSS-REFERENCE TO RELATED APPLICATION

This application is based upon and claims the benefit of priority of the prior Japanese Patent Application No. 2013-032361, filed on Feb. 21, 2013, the entire contents of which are incorporated herein by reference.

FIELD

A certain aspect of the present invention is related to a circuit and a method for generating pseudorandom numbers.

BACKGROUND

It is known to use a linear feedback shift register as a method for generating pseudorandom numbers using hardware. For example, there is known a linear feedback shift register that uses a primitive polynomial and generates an M-sequence as pseudorandom numbers (see Japanese Laid-Open Patent Publications Nos. 6-291619, 1-265609 and 2003-330704, for example).

SUMMARY

According to an aspect of the present invention, there is provided a pseudorandom number generating circuit including: a first generator including a shift register and configured to generate a first pseudorandom number, the shift register including registers, the first pseudorandom number having a plurality of bits corresponding to the registers; a second generator configured to generate a second pseudorandom number; and a selector configured to select a bit that is to be output from the plurality of bits by using the second pseudorandom number.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an exemplary output of a pseudorandom number generating circuit in accordance with a second embodiment;

DESCRIPTION OF EMBODIMENTS

The random numbers generated by using the linear feedback shift register has a very good characteristic as a one-bit pseudorandom number. However, the randomness may be degraded if a pseudorandom number composed of a plurality of bits is generated.

According to an aspect of embodiments, the randomness is improved.

Figures 1, 2:
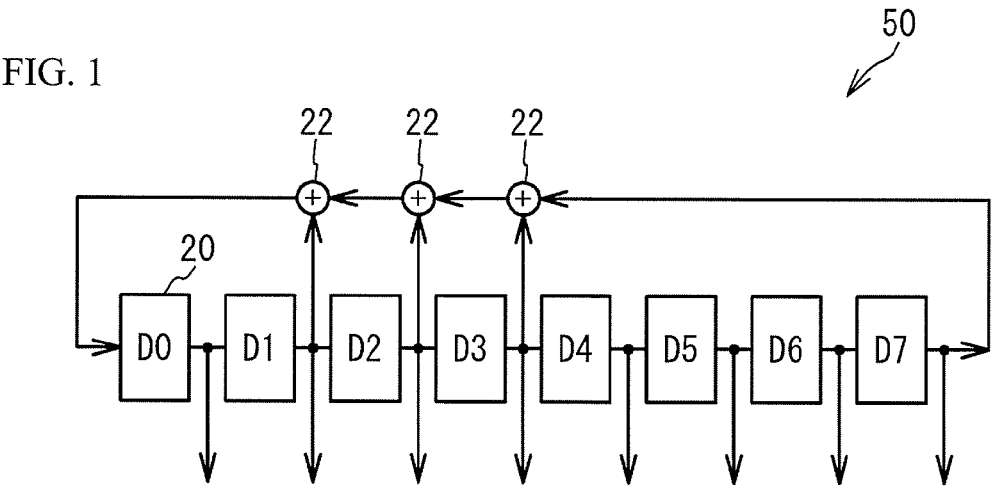
FIG. 1 is a block diagram of a linear feedback shift register generating an M-sequence.
FIG. 2 illustrates an exemplary output of the linear feedback shift register.

First, a description is given of a linear feedback shift register that generates an M-sequence as a pseudorandom number. FIG. 1 is a block diagram of a linear feedback shift register that generates an M-sequence. Referring to FIG. 1, a linear feedback shift register 50 includes a plurality of registers 20 and exclusive-OR circuits 22. Read outputs of registers D1 through D7 are output to the outside every cycle, and are applied to registers D1 through D0 of the next stages. The exclusive-OR circuits 22 execute an exclusive-OR operation on two inputs.

The linear feedback shift register 50 generates pseudorandom numbers by using a primitive polynomial of degree 8, namely, $M(x)=x^8+x^4+x^3+x^2+1$. For a primitive polynomial of degree n, ($2^n-1$) pseudorandom numbers can be generated. Only a finite number of primitive polynomials exist.

FIG. 2 illustrates exemplary outputs of the linear feedback shift register 50. Columns of D7 through D0 indicate the outputs of the registers D7 through D0. The column of decimal notation describes the values of D7 through D0 in decimal notation. The outputs of D7 through D0 and the corresponding decimal number are described for each cycle. In cycle 1, 00110000 is given as an arbitrary initial value. For example, as indicated by an enclosure 60, a number in an arbitrary column is a random number. As indicated by an enclosure 62, a number in an arbitrary row is a random number. In contrast, as indicated by an enclosure 64, a number extending over a plurality of rows has low randomness. This is because the number in a row is obtained by shifting the numbers in the next rows by one bit. For example, D7 through D1 in cycle 2 is the same number as that of D6 through D0 in cycle 1.

There are some methods for irregularly using a random number composed of a desired multi-bit-width by using the M-sequence pseudorandom number generating circuit. A first method is to obtain a random number composed of a desired number of bits from an identical register (for example, register D0) over a desired number of cycles. A second method is to obtain a random number composed of the bits of the registers D7 through D0 in a certain cycle, as indicated by the enclosure 62 in FIG. 2. A third method is to prepare a linear feedback shift register having registers as many as the desired number of bits.

However, according to the first method, it takes a long time to generate a random number having a desired bit width. The second method has poor randomness when a random number extending over a plurality of columns is generated as indicated by the enclosure 64. This is because the number in a row is obtained by shifting the numbers in the next rows by one bit on the bit base. The third method has a disadvantage that a linear feedback shift register having a desired number of bits may be unavailable since only a finite number of primitive polynomials exist. For example, eight primitive polynomials of degree 8 are known and three primitive polynomials of degree 5 are known. However, no primitive polynomial of degree 34 is known.

It is desired to provide a pseudorandom number generating circuit that is capable of irregularly generating a pseudorandom number and handling a large bit-width and has no correlation between the successive random numbers.

First Embodiment

Figure 3A:
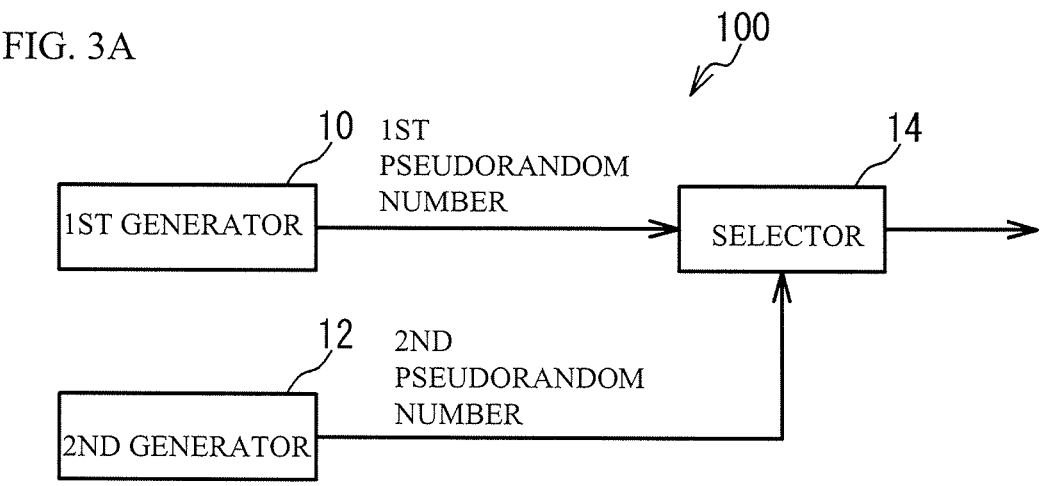
FIG. 3A is a block diagram of a pseudorandom number generating circuit in accordance with a first embodiment.
Figure 3B:
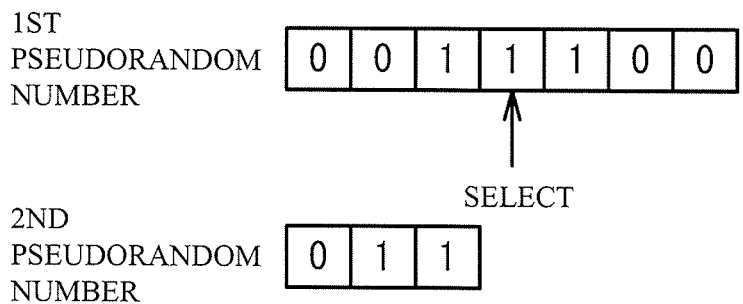
FIG. 3B illustrates pseudorandom numbers.

FIG. 3A is a block diagram of a pseudorandom number generating circuit in accordance with a first embodiment, and FIG. 3B illustrates pseudorandom numbers. Referring to FIG. 3A, a pseudorandom number generating circuit 100 includes a first generator 10, a second generator 12 and a selector 14. The first generator 10 includes a shift register composed of a plurality of registers. The first generator 10 generates a first pseudorandom number composed of a plurality of bits corresponding to the plurality of registers. The second generator 12 generates a second pseudorandom number. The second generator 12 may have a shift register or another circuit.

Referring to FIG. 3B, the first pseudorandom number is composed of n bits, for example. The second pseudorandom number is composed of m bits, for example. In this case, an inequality $n<2^m$ stands. For example, n=7 and m=3. The selector 14 selects a bit that is to be output from the bits of the first pseudorandom number in accordance with the second pseudorandom number. For example, the selector 14 selects one of the bits of the first pseudorandom number in accordance with the number indicated by the second pseudorandom number. For example, in FIG. 3B, since the second pseudorandom number is 011, the fourth bit of the first pseudorandom number is selected by the selector 14.

According to the first embodiment, the selector 14 selects the bit that is to be output from the bits of the first pseudorandom number by using the second pseudorandom number. It is thus possible to improve the randomness, as compared to the circuit using only one pseudorandom number generating circuit.

Second Embodiment

Figure 4:
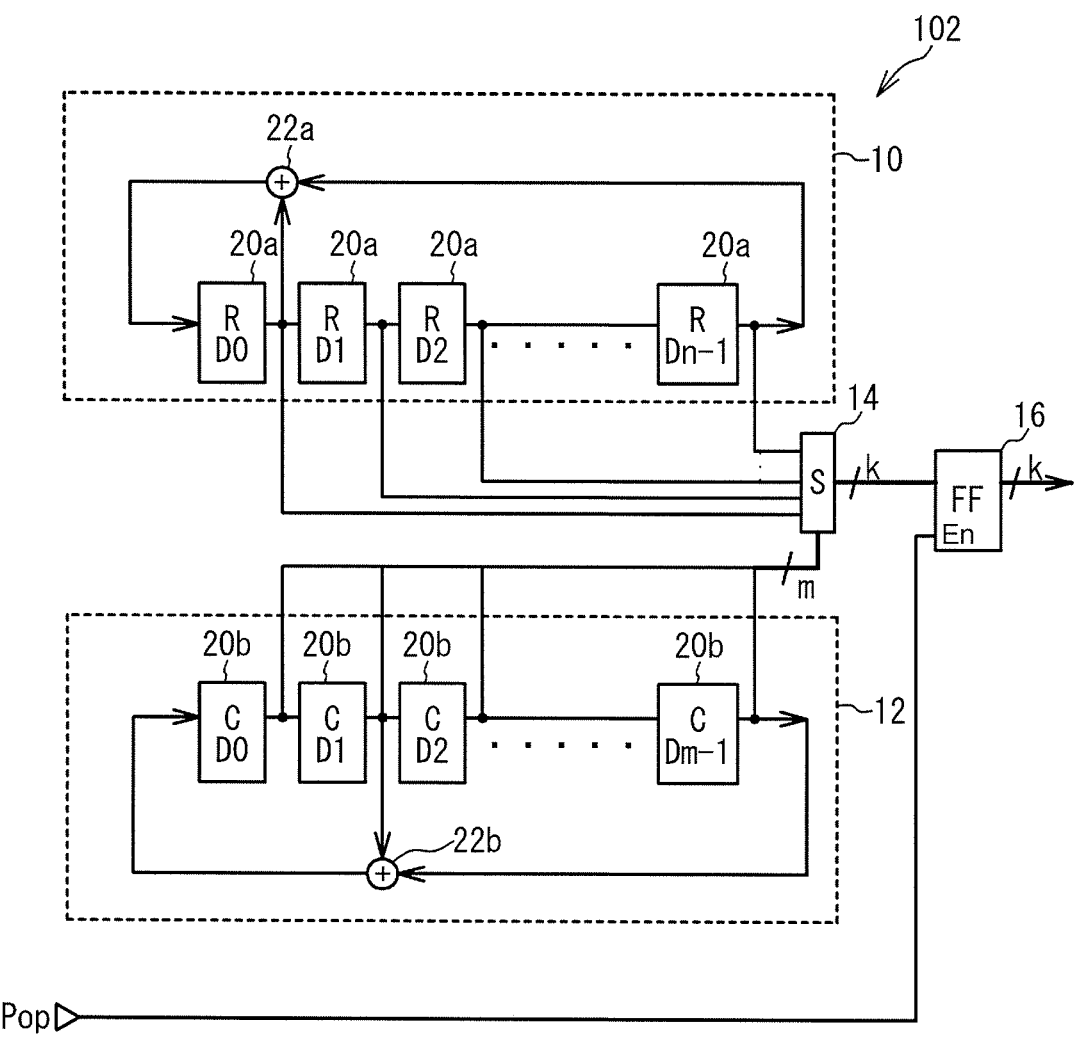
FIG. 4 is a block diagram of a pseudorandom number generating circuit in accordance with a second embodiment.

A second embodiment is an exemplary pseudorandom number generating circuit using a circuit that generates an M-sequence. FIG. 4 is a block diagram of a pseudorandom number generating circuit in accordance with the second embodiment. Referring to FIG. 4, a pseudorandom number generating circuit 102 includes the first generator 10, the second generator 12, the selector 14 and a flip-flop circuit 16. The first generator 10 is an M-sequence generator having n registers 20a (RD0 through RDn−1), and generates an M-sequence composed of n bits (hereinafter, referred to as R-sequence). The first generator 10 includes an exclusive-OR circuit 22a in conformity with the primitive polynomial. The outputs of the registers 20a are applied to the selector 14 as the bits of the first pseudorandom number (R-sequence). The second generator 12 is an M-sequence generator having m registers 20b (CD0 through CDm−1), and generates an M-sequence of m bits (hereinafter, referred to as C-sequence). An exclusive-OR circuit 22b in conformity with the primitive polynomial is provided in the second generator 12. The outputs of the registers 20b are applied to the selector 14 as the bits of the second pseudorandom number (C-sequence). The m bits of the second pseudorandom number are expressed together on a single line in FIG. 4 because the second pseudorandom number is used as the numerical value of m bits.

The selector 14 selects k bits out of the first pseudorandom number (R-sequence) starting with the bit indicated by the second pseudorandom number (C-sequence), the selected k bits being output to the flip-flop circuit 16. The parameter k may be a fixed number or a changeable number. The flip-flop circuit 16 (hold circuit) holds the pseudorandom number output from the selector 14 when an activation signal Pop is made active. Thus, the pseudorandom number generating circuit 102 is capable of generating a pseudorandom number at an arbitrary time.

Figure 5:
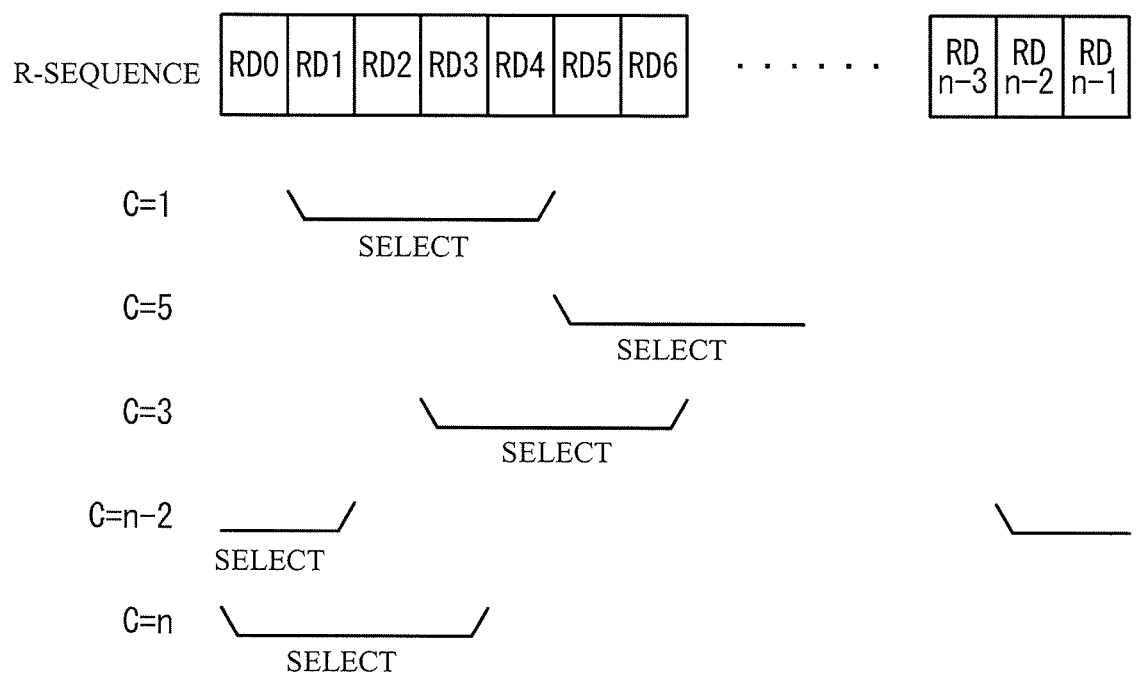
FIG. 5 illustrates bits that are to be selected from an output of a first generator.

FIG. 5 illustrates bits selected from the output of the first generator by the selector. The first pseudorandom number (R-sequence) has a plurality of bits corresponding to registers RD0 through RDn−1. It is assumed that the number k of bits to be output is 4. When the numerical value C indicated by the second pseudorandom number (C-sequence) is 1, the selector 14 selects bits corresponding to RD1 through RD4. When C is equal to 5, the selector 14 selects bits corresponding to RD5 through RD8. When C=3, the selector 14 selects bits corresponding to RD3 through RD6. When C=n−2, the selector 14 selects bits corresponding to RDn−2, RDn−1, RD0 and RD1. As described above, if the bits to be selected exceed the cycle, the bit or bits from the beginning bit in the next cycle are successively selected. When C=n, the selector 14 selects bits corresponding to RD0 through RD3.

It is noted that n and m are degrees with which primitive polynomials exist. It is preferable the variable range of the C-sequence expresses all the registers of the R-sequence in order to select the bit of the R-sequence with which random selection based on the numerical value indicated by the C-sequence is initiated. That is, the number of bits of the numerical value indicated by the C-sequence is equal to or smaller than the number of bits of the R-sequence. Therefore, it is preferable that $n<2^m$. For example, when n=127, m is equal to 7. As described above, the number of bits of the second pseudorandom number is smaller than that of the first pseudorandom number.

The first pseudorandom number has a cycle of $(2^n-1)$, and the second pseudorandom number has a cycle of $(2^m-1)$. In the second embodiment, the value of the first pseudorandom number is selected on the basis of the value of the second pseudorandom number. Thus, the lowest common multiple of $(2^n-1)$ and $(2^m-1)$ is the cycle of the pseudorandom number generated by the pseudorandom number generating circuit 102.

FIG. 6 illustrates exemplary outputs of the pseudorandom number generating circuit of the second embodiment. Referring to FIG. 6, there is illustrated a case where pseudorandom numbers of eight bits are generated. Random data are available even over successive cycles.

The pseudorandom number generating circuit 102 of the second embodiment irregularly generates the pseudorandom number by activating the activation signal Pop. As an increased number of registers in the first generator 10, the pseudorandom number generating circuit 102 is capable of handling a larger bit width. Further, the pseudorandom number generating circuit 102 has no correlation between the random numbers in the adjacent cycles. Furthermore, in the M-sequence, the same random number appears in the same cycle when the same initial value (seed) is used. It is therefore possible to reproduce the same random number sequence. The initial value is a value other than zero.

The selector 14 is capable of selecting the bit that is to be initially output out of the bits by using the second pseudorandom number. The selector 14 is capable of outputting a fixed number of bits out of the bits from the starting bit.

Third Embodiment

Figure 7:
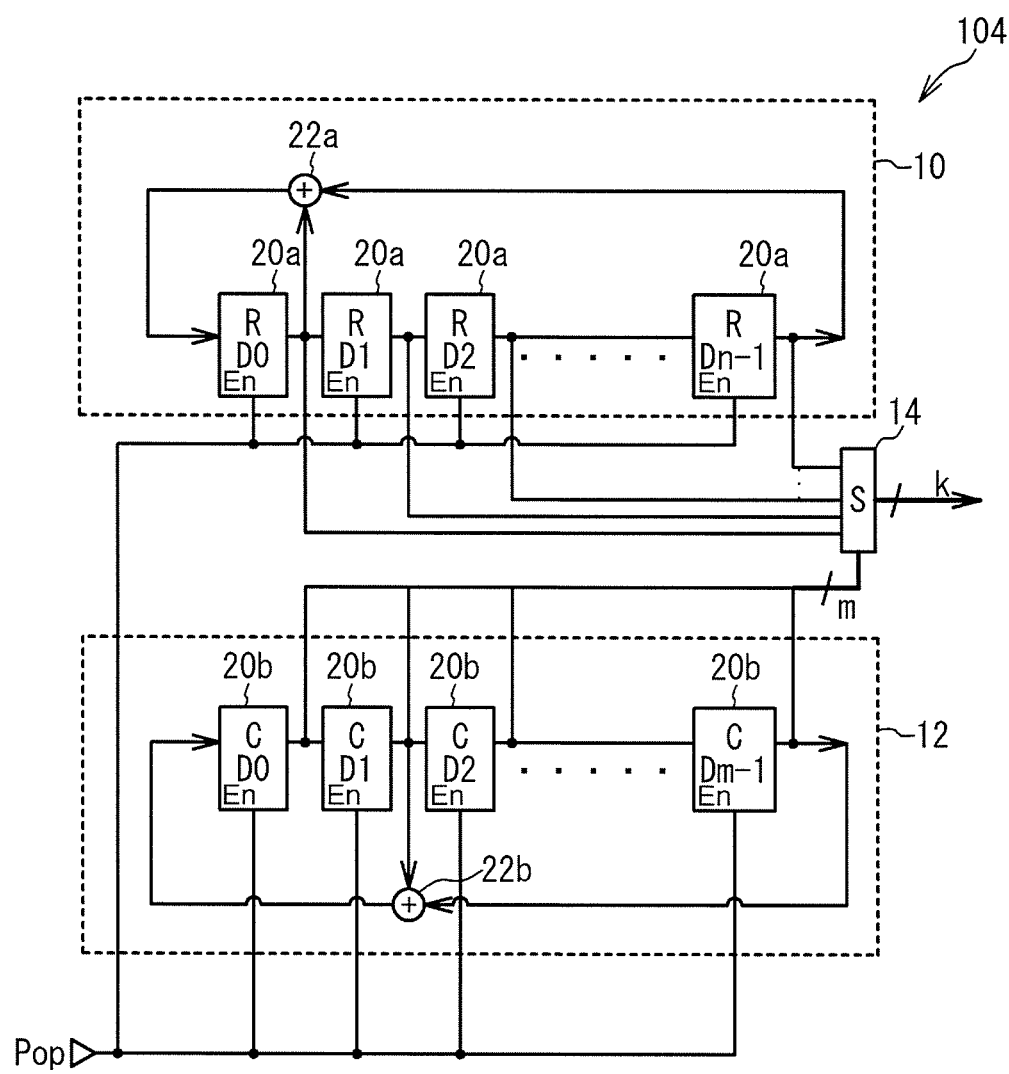
FIG. 7 illustrates an exemplary output of a pseudorandom number generating circuit in accordance with a third embodiment.

FIG. 7 is a block diagram of a pseudorandom number generating circuit in accordance with a third embodiment. Referring to FIG. 7, a pseudorandom number generating circuit 104 does not have any flip-flop circuit. The activation signal Pop is applied to enable terminals En of the registers 20a and 20b. The other structures of the third embodiment are the same as those of the second embodiment, and a description thereof is omitted here.

According to the third embodiment, when the activation signal Pop is activated, the first generator 10 generates the first pseudorandom number, and the second generator 12 generates the second pseudorandom number. Thus, the pseudorandom number generating circuit 104 is capable of generating the pseudorandom number at an arbitrary time.

Fourth Embodiment

Figure 8:
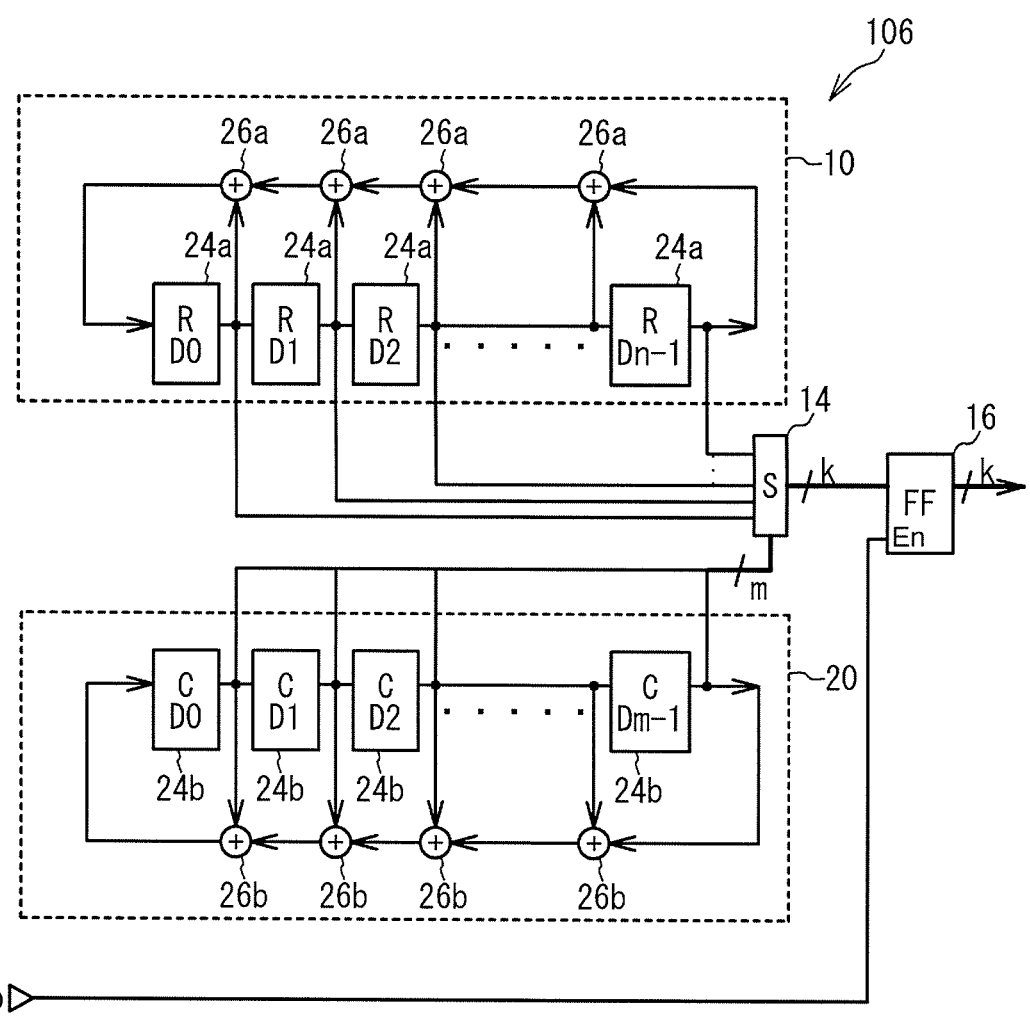
FIG. 8 illustrates an exemplary output of a pseudorandom number generating circuit in accordance with a fourth embodiment.

A fourth embodiment is an exemplary pseudorandom number generating circuit using a PN sequence. FIG. 8 is a block diagram of a pseudorandom number generating circuit in accordance with the fourth embodiment. Referring to FIG. 8, there is illustrated a pseudorandom number generating circuit 106. The first generator 10 is a PN sequence generating circuit composed of n registers 24a (RD0 through RDn−1), and generates an R-sequence of n bits. An excusive-OR circuit 26a is provided for each of the registers 24a. The outputs of the registers 24a are input to the selector 14 as the bits of the first pseudorandom number (R-sequence). The second generator 12 is a PN sequence generating circuit having m registers 24b (CD0 through CDm−1), and generates a C-sequence of m bits. An exclusive-OR circuit 26b is provided for each of the registers 24b. The outputs of the registers 24b are input to the selector 14 as the bits of the second pseudorandom number (C-sequence). The other structures of the fourth embodiment are the same as those of the second embodiment, and a description thereof is omitted here.

The PN sequence is generated by arranging the exclusive-OR circuits 26a and 26b to arbitrary registers 24a and 24b. As in the case of the fourth embodiment, the exclusive-OR circuits 26a and 26b may be arranged to all of the registers 24a and 24b. The exclusive-OR circuits 26a and 26b may be arranged to only some of the registers 24a and 24b. The M-sequence corresponds to a particular case where the M-sequence is a primitive polynomial out of the PN sequence.

Fifth Embodiment

Figure 9:
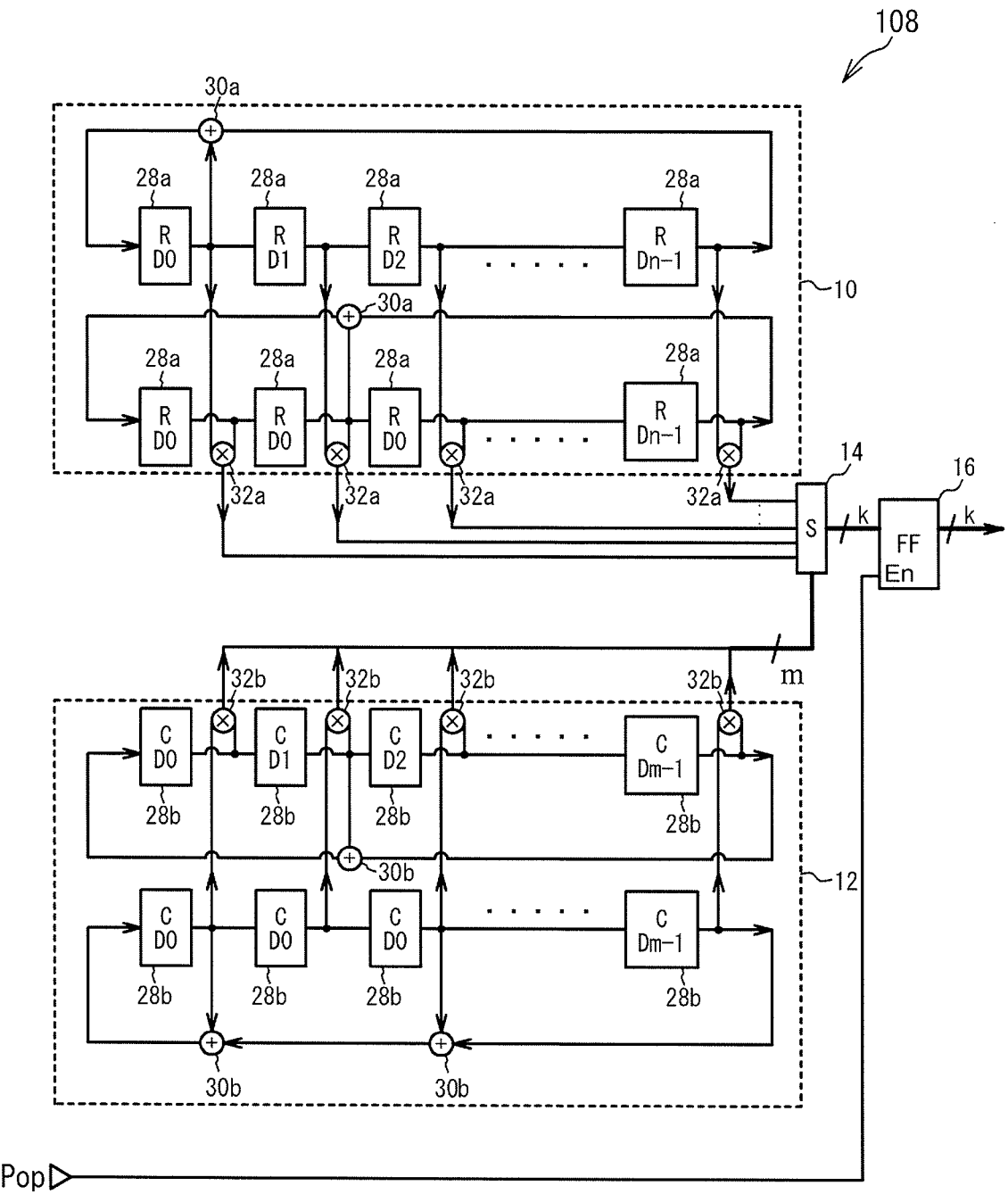
FIG. 9 illustrates an exemplary output of a pseudorandom number generating circuit in accordance with a fifth embodiment.

A fifth embodiment is an exemplary pseudorandom number generating circuit using a circuit that generates a Gold sequence. FIG. 9 is a block diagram of a pseudorandom number generating circuit in accordance with the fifth embodiment. Referring to FIG. 9, there is illustrated a pseudorandom number generating circuit 108. The first generator 10 and the second generator 12 are Gold-sequence generators, and generate an R-sequence of n bits and a C-sequence of m bits, respectively. The Gold sequence is generated by an AND operation of a plurality of M-sequences. The Gold sequence may be generated by an exclusive-OR operation on a plurality of M-sequences.

The first generator 10 includes a pair of lines each having n registers 28a (RD0 through RDn−1). An exclusive-OR circuit 30a is provided in accordance with the primitive polynomial. The first generator 10 includes AND circuits 32a, each of which is associated with the respective one of the n pairs of registers 28a, and executes an AND operation on the outputs of the respective one of the n pairs of registers 28a. The outputs of the AND circuits 32a are applied to the selector 14 as the bits of the Gold sequence. The second generator 12 includes a pair of lines each having m registers 28b (CD0 through CDm−1). An exclusive-OR circuit 30b is provided in accordance with the primitive polynomial. The second generator 12 includes AND circuits 32b, each of which is associated with the respective one of the m pairs of registers 28b, and executes an AND operation on the outputs of the respective one of the m pairs of registers 28b. The outputs of the AND circuits 32b are applied to the selector 14 as the bits of the Gold sequence. The other structures of the fifth embodiment are the same as those of the second embodiment, and a description thereof is omitted here.

As in the cases of the second through fifth embodiments, the first generators 10 use the linear feedback shift registers. In the second and third embodiment, the linear feedback shift registers generate the M-sequences. In the fourth embodiment, the linear feedback shift registers generate the PN sequence. In the fifth embodiment, the linear feedback shift register generates the Gold sequence.

The second generator 12 may be a circuit other than the linear feedback shift register. However, the second generator 12 may be the linear feedback shift register, as in the cases of the second through fifth embodiments. The first generator 10 and the second generator 12 may be mutually different types of linear feedback shift registers.

As in the case of the third embodiment, the fourth and fifth embodiments may be varied so that the first generator 10 generates the first pseudorandom number when the registers are activated by the activation signal.

The pseudorandom number generating circuits of the first through fifth embodiments may be used for logic verification using a logic emulator or an FPGA (Field Programmable Gate Array). In this field, it is demanded to have pseudorandom numbers having good randomness. The use of software for generating the pseudorandom numbers has a difficulty in high speed operation. High speed operation may be ensured by storing the pseudorandom numbers generated by software and reading the pseudorandom numbers from the memory. However, this method consumes a large amount of memory and inevitably uses a large circuit scale. In contrast, the pseudorandom number generating circuits of the first through fifth embodiments are capable of generating the pseudorandom numbers having good randomness at high speed. It is thus possible to reduce the amount of memory and reduce the circuit scale. Of course, the pseudorandom number generating circuits may be used for various applications other than the above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A pseudorandom number generating circuit comprising:
a first generator including a shift register and configured to generate a first pseudorandom number, the shift register including a plurality of registers, the first pseudorandom number having a plurality of bits corresponding to the plurality of registers, respectively;
a second generator configured to generate a second pseudorandom number; and
a selector configured to select a single bit that is to be output from the plurality of bits by using the second pseudorandom number, the single bit being corresponding to a number indicated by the second pseudorandom number.

2. The pseudorandom number generating circuit according to claim 1, wherein:
   the plurality of bits are ordered; and
   the selector is configured to select second bits in order from the single bit that are to be output from the plurality of bits.

3. The pseudorandom number generating circuit according to claim 2, wherein the selector is further configured to select a given number of the second bits.

4. The pseudorandom number generating circuit according to claim 1, wherein the second pseudorandom number has a smaller number of bits than the first pseudorandom number.

5. The pseudorandom number generating circuit according to claim 1, wherein the shift register is a liner feedback shift register.

6. The pseudorandom number generating circuit according to claim 5, wherein the linear feedback shift register generates the first pseudorandom number of an M-sequence.

7. The pseudorandom number generating circuit according to claim 5, wherein the linear feedback shift register generates the first pseudorandom number of a Gold sequence.

8. The pseudorandom number generating circuit according to claim 5, wherein the linear feedback shift register generates the first pseudorandom number of a PN sequence.

9. The pseudorandom number generating circuit according to claim 1, further comprising a hold circuit configured to hold an output of the selector when an activation signal is activated.

10. The pseudorandom number generating circuit according to claim 1, wherein the first generator generates the first pseudorandom number when an activation signal is activated.

11. A method for generating a pseudorandom number comprising:
   generating a first pseudorandom number having a plurality of bits corresponding to a plurality of registers of a shift register, respectively;
   generating a second pseudorandom number; and
   selecting a single bit that is to be output from the plurality of bits by using the second pseudorandom number, the single bit being corresponding to a number indicated by the second pseudorandom number.

* * * * *